United States Patent Office 3,655,838
Patented Apr. 11, 1972

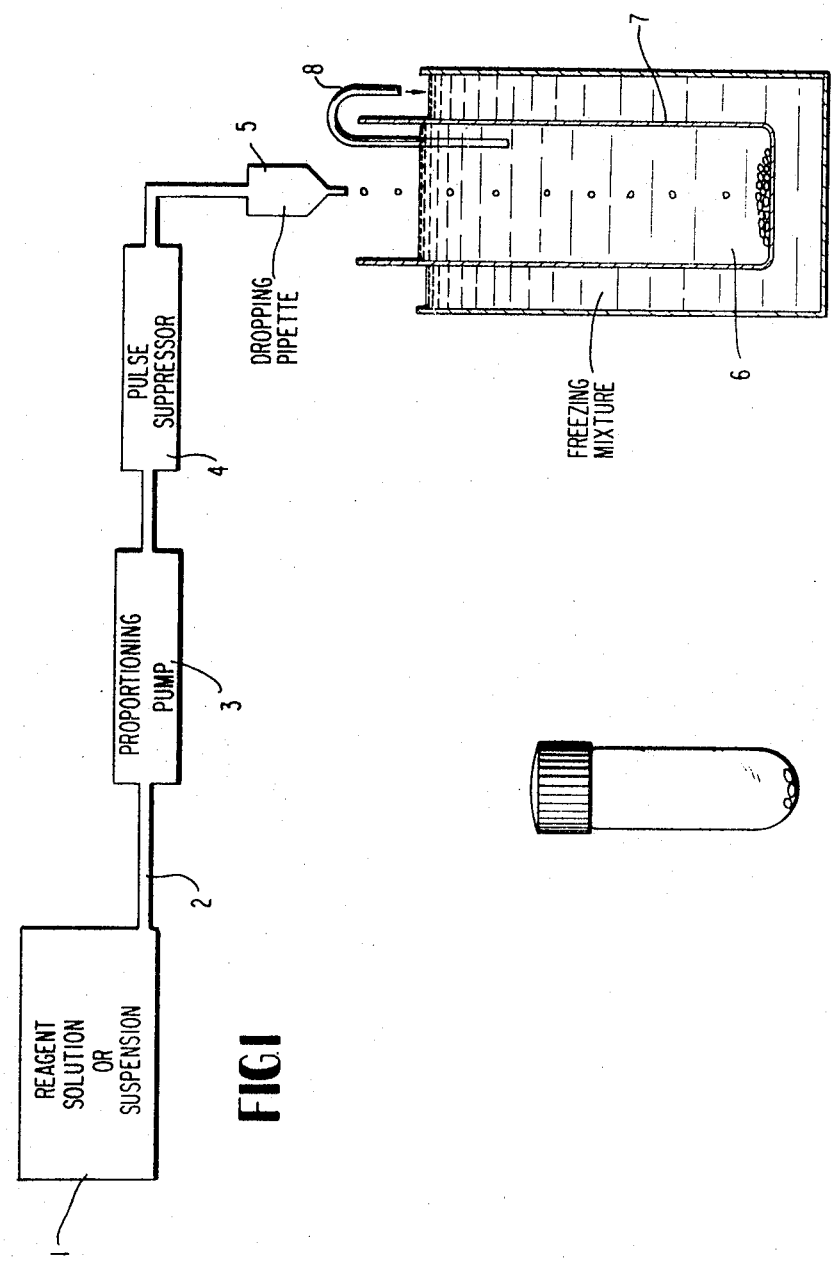

3,655,838
METHOD OF PELLETIZING ANALYTICAL OR IMMUNOLOGICAL REAGENTS
Richard Thompson Price, Verona, and Stuart Michael Bauer, Parsippany, N.J., John Brownlee, West Seneca, N.Y., and Bastiaan Cornelis Goverde, Oss, Netherlands, assignors to Organon, Inc., West Orange, N.J.
Filed Mar. 20, 1969, Ser. No. 808,803
Int. Cl. B01j 2/06
U.S. Cl. 264—13                                    7 Claims

ABSTRACT OF THE DISCLOSURE

Pelletized analytical and immunological reagents are prepared in a stable accurate form containing predetermined and pretested measured amounts of substances capable of participating in analytical and immunological reactions, such as pregnancy tests, by forming these reagents into frozen and freeze-dried beads or spheres; a set of these pellets comprising an antiserum and an antigen is placed in a test vessel and moistened with the liquid to be tested and then allowed to stand until agglutination or precipitin reaction does or does not occur.

BACKGROUND OF THE INVENTION

The present invention relates to a novel method for the production of pelletized analytical or immunological reagents.

The analytical and immunological reagents with which the present invention is concerned are most commonly employed for laboratory tests which have as their objective the determination of the presence or absence of antigens or antibodies or enzymes in body fluids as an aid in the diagnosis of certain physiological or pathological conditions in humans and animals. Depending upon the particular combination of reagents and test liquid employed, the reaction may result in the formation of a precipitate in which case it is known as a precipitin reaction. Where the reaction is between substances distributed in a liquid medium, at least one of which substances is a solid which becomes agglomerated, the reaction is known as an agglutination reaction. The formation of the precipitate, or the agglutination or inhibition of agglutination of specially-treated particles is manifested visually in the way the precipitate forms or the particles arrange themselves following reaction.

The immunological tests, which may include, for example, tests for blood group type, pregnancy, and similar phenomena, are customarily performed with reagents such as, for example, a suspension of sensitized erythrocytes, and a solution of suitable antiserum, dispensed into a test vial from a dropper. Even though the suspension of erythrocytes may have been titered very carefully the use of vials and droppers is not only expensive, but is likely to result in questionable findings because of the limitations in the accuracy of ordinary droppers. Such droppers are usually uncalibrated, and although the accuracy of the drop size is of great importance, such accuracy is rarely attained and the size of the drops is variable and undependable.

In view of the shortcomings of the vial-dropper test methods, it has been proposed in the prior art to carry out agglutination reactions by depositing an accurately measured drop of a reagent onto a slide or cardboard supporting surface and allowing the drop to be dried, whereupon the test liquid can subsequently be deposited thereon to observe the results. Methods of this type are also subject to inaccuracies in the application of the reagents as well as the observations made.

It is also frequently necessary for immunological reagents, such as sensitized erythrocytes, or sensitive protein materials, to be preserved by refrigeration. This necessarily involves the presence of special refrigeration equipment and is space-consuming and also time-consuming because of the problem of transferring refrigerated solutions. Efforts have been made to overcome the limitations of the vial-dropper test methods, and the slide type methods, by subjecting reagents, which may be incompatible with each other in the presence of moisture, to freezing in successive layers in a container and thereafter freeze-drying the frozen strata, and a method of this type is described in U.S. Pat. 3,269,905. However, such a procedure requires special apparatus and technical knowledge and is expensive and time-consuming to carry out.

GENERAL DESCRIPTION OF THE INVENTION

A principal object of the present invention is to provide in a single container, all the necessary analytical reagents for diagnostic tests of the types previously described in a pelletized form in which they are stable, accurate in unit content, and completely non-reactive until they are contacted by the liquid to be tested. Another object of the invention is to provide a method for the manufacture of pelletized analytical, immunological, or diagnostic reagents which is inexpensive and practical and which does not require special elaborate equipment but which may be carried out conveniently for commercial purposes on a large scale. Still another object is to make the reagents for diagnostic tests available in a convenient form while at the same time insuring the accuracy of the amounts of reagents present to provide dependable test results. Still another object is to provide a method that permits two or more otherwise incompatible substances to be freeze-dried in a single container, while avoiding premature reaction which might come about in the presence of moisture. A further objective is to provide a person performing a diagnostic test with a simple container device in which the reagents are present in pelletized form so that the test results can be visually observed.

Pelletized reagents

In accordance with a first aspect of the present invention, there are provided novel dry solid stable pelletized analytical, diagnostic, and immunological reagents in the form of beads or small spheres, each furnishing a predetermined and accurately measured quantity of the reagent. Even though the reagents from which the pellets are prepared are reactive and may even be mutually incompatible, the pellets themselves have the advantage that they are stable and may be present together in a common container for an indefinite period of time without interaction. However, the reagents in the pellets are readily reconstituted and made ready for an analytical, immunological or diagnostic test by the simple addition thereto of the liquid to be tested.

The composition, preparation and use of the pelletized reagents of the invention will be specifically illustrated with respect to reagents for an immunological or diagnostic test for detecting the presence of human chorionic gonadotropic (HCG) in urine, which test is utilized in the diagnosis of pregnancy.

However, it will be readily understood by those skilled in this art that the principles of the invention are not to be regarded as limited thereto, but may be extended to the preparation and use of a wide range of pelletized analytical, immunological, and diagnostic reagents, and to a wide variety of tests which may employ one or a multiplicity of different pelletized reagents. Furthermore, auxiliary substances, such as buffers, may also be pelletized in accordance with the invention and may be utilized in dry stable form in conjunction with one or more diagnostic test reagent pellets.

The process of preparation of the pelletized reagents of the invention broadly comprises the steps of:

(a) Forming an aqueous solution or suspension of the reagent having a predetermined concentration;

(b) Forming an accurately measured or calibrated, free-falling drop of said solution or suspension;

(c) Allowing said drop to fall through a body of a water-immiscible liquid having a density less than that of water and having a temperature gradient ranging from approximately ambient at its upper surface to at most a temperature below the freezing point of the solution being frozen at the lower portion of the column, thereby freezing said drops to frozen pellets or beads; and (d) Collecting the frozen pellets containing a predetermined quantity of the reagent at the bottom of said body of liquid. The pellets may then be dried by any suitable method, but freeze-drying is preferred.

The method of preparation of the pellets of the invention will be better understood by reference to the accompanying drawings, in which FIG. 1 depicts in diagrammatic form a system for the formation of drops of reagent and the freezing thereof to solid stable pellets.

Referring to FIG. 1, an aqueous solution or suspension containing a known concentration of the reagent is first prepared. Advantageously there is incorporated into the solution or suspension a suitable quantity of an inert matrix-producing substance or bulking agent, which aids in giving body to the freeze-dried pellet. Examples of suitable bulking agents include sugars, such as sucrose, mannose, lactose and mannitol, proteinaceous materials, such as serum protein, lactalbumin hydrolysate, and casein hydrolysate.

The reagent solution or suspension is pumped from its storage vessel 1 through a flexible conduit 2, which may be made of plastic, for example, transparent polyethylene tubing, by means of a proportioning pump 3. This is preferably a pulsating type pump which compresses the flexible tubing by means of rollers, thereby measuring a predetermined amount of solution per unit time. To form accurate drops, a pump which delivers about 2.0 ml. per minute is used. From the pump 3 the solution flows through a pulse suppressor 4 so that a nearly uniform flow is maintained. Thence the solution passes to a special type of dropping pipette 5 which discharges a predetermined, accurately measured amount in the form of a drop. Such a drop may contain, for example, from about 0.025 to about 0.07 ml. For HCG antiserum and antigen solutions precisely 0.05 ml. is chosen, since this provides frozen pellets of suitable size for testing purposes.

The pipette 5 is positioned at a suitable height above the surface of a body of water-immiscible liquid 6 which is held in a container 7, and in which the drop is frozen. The pipette is at such a height above the level of the water-immiscible liquid that splashing is prevented while at the same time the height allows for a free fall of the drop which results in proper drop size and formation of true spherical shape, either before or after entry into the water-immiscible liquid. In order to maintain the height from which the drop falls to prevent drop distortion and splash, a suction tube 8 is placed at an appropriate level. As the hexane is displaced by the aqueous volume introduced as drops this suction line pulls off excess hexane and thereby maintains a constant level.

The water-immiscible liquid used for freezing may be a liquid hydrocarbon or a liquid halogenated hydrocarbon, or mixtures thereof. Examples of suitable liquids include hexane, carbon disulfide, chloroform, heptane, iso-octane, or toluene, as well as mixtures such as hexane-chloroform or benzene-hexane. These mixtures are designed so that they will always have a density less than water. For example, hexane has a specific gravity of 0.6593 at 20°–4° C. The specific gravity can be adjusted to any desired level by blending with the hexane another liquid such as carbon tetrachloride, in order to maintain a controlled rate of fall of the drop. The rate of fall is advantageously of the order of about 1 foot per 2 seconds, depending upon the length of the liquid column. The longer the column, the faster the rate of fall which can be maintained.

The body of freezing liquid is maintained with a temperature gradient which ranges from near ambient at its upper surface and diminishes in the direction of the bottom of the liquid in such a manner that the temperature drops to about —70° C. in the bottom portion. Advantageously the liquid is maintained for a short distance below its upper surface at a temperature between about 0° and 20° C. Below this level the cooling of the liquid is arranged in such a manner that the temperature drops to —70° C. in the bottom portion. However, any lower temperature than this figure can also be utilized, depending upon the nature of the liquid and the reagent being treated. For example, cryogenic liquids such as liquid nitrogen which has a boiling point of —143° C., or liquid oxygen which has a boiling point of —183° C., may also be employed.

The desired temperature of the liquid column is achieved either by use of a freezing mixture which surrounds the body of liquid or by mechanical refrigeration to equivalent temperatures. For example, the freezing mixture may be a combination of Dry Ice and acetone, or of Dry Ice and methyl Cellosolve (diethylene glycol monomethyl ether).

Advantageously the upper level of the refrigerated portion of the liquid, which is maintained between about 0° C. and 20° C., comprises a zone extending not more than about 6 inches below the surface of the liquid. This provides a 6 inch fall at a temperature above freezing and thus an opportunity for formation of a truly spherical pellet.

In this way spherical drops are formed which freeze into beads as they descend through the liquid column. The frozen beads collect on the bottom and can be removed and freeze-dried to produce stable dry spheres containing accurately measured quantities of desired reagents. The frozen spheres are preferably collected in a wire mesh basket and may be readily handled mechanically so that they may be placed into any prechilled container, such as a test tube, and freeze-dried in situ. Advantageously the frozen spheres are stored under refrigeration at temperatures of —50° C., or lower to prevent crystal growth within the spheres, which might cause them to become friable.

For purposes of freeze-drying, one or more spheres of selected reagents are placed in a prechilled container and transferred without warming to the prechilled shelves of a conventional freeze-drying apparatus in which the drying takes place, for example, at a starting temperature of —50° C. and rising during the drying to +37° C. at the finish and at a pressure not higher than about $100\mu$ at the start and approaching $5\mu$ at the finish which is 18 hours to 24 hours later.

Where the reagent pellets are placed into a suitable test tube for future use the test tube may then be capped utilizing a moisture-proof closure and stored for an indefinite period. A testing device of this kind is shown in FIG. 2 of the drawings.

As will be apparent from the drawings, the test device comprises a tubular container having a transparent sidewall and bottom portion adapted to receive the liquid to be tested and provided with a moisture-proof closure. There is placed in the container at least one reagent pellet prepared in accordance with the invention. The liquid to be tested is applied to the pellet or pellets by opening the closure and introducing a measured amount of the liquid by means of a dropper.

It is apparent that the principles of the invention can be applied not only to the preparation of analytical reagents but also to the preparation of pharmaceutical dosage forms, particularly those involving small dosages of the medicament involved.

In the field of immunology by the selection of appropriate reagents, the test pellets can be used for performing any immunological test in which two incompatible test reagents are present in the same tube, such as, for example, the pregnancy test described more fully below, and also test for blood group substances in plasma and serum, blood group typing, and antigens and antibodies of various kinds, including rheumatoid factor, syphilis antigen, antistreptolysin O, infectious mononucleosis, and other agglutination or precipitin tests. Moreover, in order to demonstrate to a user of the test device what a proposed reaction looks like, or as a control, a pellet of the substance being tested for can be treated in a separate test alongside the actual specimen to be tested, using two tubes, e.g. a freeze-dried pellet of known pregnant urine.

DESCRIPTION OF THE PREFERRED EMBODIMENTS

The following examples are indicative of a presently preferred embodiment of the invention but are not to be considered as limiting the invention thereto.

The preparation of a set of test reagent pellets for the detection of human chorionic gonadotropin in urine is disclosed in the following examples:

EXAMPLE 1

Preparation of HCG antiserum pellets

The reagents are:

| | Gm. |
|---|---|
| Sucrose | 10.2 |
| Sodium chloride | 0.765 |
| Dibasic sodium phosphate heptahydrate ($Na_2HPO_4 7H_2O$) | 2.462 |
| Monobasic potassium phosphate ($KH_2PO_4$) | 0.489 |
| Distilled water, q.s. 170.0 ml. | |
| Anti-human chorionic gonadotropin | ([1]) |

[1] Q.s. to yield sensitivity factor of 650–800 I.U. HCG/liter and 5, 5, 3–1, 2–0 reactions with urine at 0, 500, 750, and 1000 I.U./liter urine, respectively. A reaction graded 5 is complete agglutination and 0 is complete inhibition.

The above salts are dissolved in approximately 150 ml. water. The pH of the resultant solution is adjusted to 7.2 (±0.05) with 0.1 N HCl or 0.1 N NaOH. The required amount of water is added to bring the volume to 170 ml. Chill in an ice bath and add the exact predetermined quantity of anti-HCG serum to yield the required dilution. From this point on the solution is kept chilled in an ice bath.

A clean 0.05 ml. microtiter dropping pipette delivery apparatus is flushed out with this diluted antiserum by runing an Auto analyzer proportioning pump until one or two milliliters have been pumped, taking care to remove any bubble in the delivery tube. Then the pump is stopped and the microtiter delivery apparatus placed in position in the freezing column. The pump is started and the manufacture of the pellets is commenced.

When the pellets are removed from the freezing column, they are stored under hexane in a closed container in either a Dry Ice chest or in a mechanical refrigerator maintained at −50° C. to −60° C.

EXAMPLE 2

Preparation of pellets of sensitized erythrocytes

A suspension of sheep erythrocytes is treated in conventional manner with formalin and tannin and centrifuged and washed with a phosphate sodium chloride buffer of pH 6.4 and then incorporated in this buffer. To this mixture there is added an equal volume of a solution of 50 I.U. HCG per ml. in a buffer of pH 6.4. The mixture is stored for 48 hours at 37° C., whereupon formaldehyde is added until final concentration is obtained of 0.25% (wt./vol.) formaldehyde. Next this mixture is stored for 15 hours at 37° C., whereupon the erythrocytes are again centrifuged, washed with physiological salt solution, incorporated as 10% v./v. suspension in a physiological salt solution containing 0.1% of bovine serumalbumin and stored until needed at 0°–4° C. Thereafter the erythrocytes are centrifuged, washed with physiological salt solution and freeze-dried in conventional manner. Alternatively the formolized tanned cells are washed and suspended in a phosphate sodium chloride buffer at pH 7.6. To this mixture is added an equal volume of a solution of 50 I.U. HCG/ml. This mixture is maintained at 56° C. for 18 hours, then washed and resuspended in 0.9% sodium chloride and mixed equal parts with a solution of formaldehyde (1.5%) in 0.9% saline. This mixture is stored at 2°–8° C. for about one week whereupon the erythrocytes are again washed with 0.9% sodium chloride and finally suspended to a concentration of 6.6% in a mixture of pH 7.2 phosphate buffer containing sucrose 6% and bovine serumalbumin 1.5%. This mixture is freeze-dried and held dry until needed.

The sheep erythrocytes which have thus been sensitized by chemically affixing HCG to their surfaces are suspended in a mixture of buffer and a diluent such as sucrose and bovine serumalbumin, so that there is contained in each 0.05 ml. the precise optimal quantity for a single HCG test.

Erythrocyte pellets are produced by reconstituting the previously freeze-dried, sensitized erythrocytes to 5/6 the original volume, i.e. 12 ml. of freeze-dried 6.67% suspension in final suspension medium are reconstituted with 10 ml. of distilled water. This suspension is pumped to a microtiter dropping pipette. Fine bore polyethylene tubing (I.D.=0.023″) is used to minimize erythrocytes settling and the pump is not turned off during the process except momentarily.

The suspension is converted into calibrated drops as previously described which are allowed to fall through a column of hexane cooled by a mixture of Dry Ice-methyl Cellosolve, the temperature of the hexane ranging from about ambient at its upper surface to −70° C. near the bottom of the column. The pellets are collected and stored as in Example 1.

EXAMPLE 3

Preparation of buffer pellets

The reagents are:

| | Gm. |
|---|---|
| Sucrose | 10.2 |
| Sodium chloride | 0.765 |
| Dibasic sodium phosphate heptahydrates ($Na_2HPO_4 7H_2O$) | 2.462 |
| Monobasic potassium phosphate ($KH_2PO_4$) | 0.489 |
| Disodium ethylenediamine tetraacetic acid | 2.720 |
| Distilled water, q.s. 170.0 ml. | |
| Aniline blue-black (Acid Black 1), 0.2 ml. stock solution. | |

The above salts are dissolved in about 150 ml. of water. The solution is adjusted to pH 7.2 with 5.0 N NaOH, then q.s. with water to 170 ml. Then add 0.2 ml. of a stock dye solution consisting of a 1.0 mg./ml. solution (store dye solution in the refrigerator). This solution need not be refrigerated during the production of the pellets.

The buffer pellets are produced in an identical manner to that described for the antiserum pellets. Subsequent to production, the handling and storage are the same.

EXAMPLE 4

Method of performing pregnancy test

One of each of the antiserum, HCG sensitized erythrocytes, and buffer pellets are placed in the bottom of the test vial shown in FIG. 2 of the drawings. There is introduced into the test vial by means of a dropper a sample of the urine to be tested and thereafter an additional volume of water is introduced equal to about four times the amount of urine added. The test vial is then recapped and shaken up and down for 30 seconds, after which it is allowed to stand undisturbed for a period of 2 hours. The bottom of the vial is visually inspected for a positive or negative indication of agglutination. The formation of a doughnut-shaped ring is a positive indication of pregnancy.

EXAMPLE 5

Application of the pellet principle in a diagnostic enzyme test

The principle of the kinetic U.V. test for the assay of serum glutamate-pyruvate transaminase activity in serum (S.G.P.T.) involves the following reactions:

(1) Assay reaction:

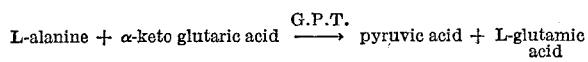

(2) Indicator reaction:

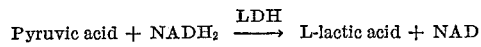

In the foregoing equations, the abbreviations mean:

G.P.T.—glutamate-pyruvate transaminase
$NADH_2$—nicotinamide - adenine - dinucleotide, reduced form
NAD—nicotinamide-adenine-dinucleotide, oxidized form
LDH—lactic acid dehydrogenase For each molecule pyruvic acid originating from reaction (1), one molecule of $NADH_2$ is oxidized to NAD. The decrease in optical density is determined directly in U.V. at 334 nm. in a 25° C. photometer cuvette.

(a) Preparation of buffer-enzyme pellets.—The following reagent solutions are prepared:

Solution 1: 250 ml. 3 millimolar aqueous solution of reduced nicotinamide - adenine - dinucleotide. The fresh solution is kept at 0°–4° C. until needed.

Solution 2: 500 ml. aqueous solution of lactic acid dehydrogenase, having at least 180,000 I.U. LDH-activity per litre. The fresh solution is kept at 0°–4° C. until needed.

Solution 3: 1250 ml. 0.2 molar aqueous solution of L-alanine.

Solution 4: 3000 ml. of an aqueous solution which is 5 millimolar in ethylenediamine tetraacetic acid and 50 millimolar in triethanolamine. The pH of this solution has been adjusted to a pH of 7.5.

The solutions 3 and 4 are thoroughly mixed and cooled to 0°–4° C. Then the solutions 1 and 2 are added and the solution is throroughly stirred.

Buffer-enzyme pellets are prepared from the foregoing mixture as described in Example 1. They are filled into small polyethylene vials as shown in FIG. 2, each vial containing that number of pellets corresponding with 0.5 ml. of the buffered solution.

After lyophilization the vials are closed with a red screw cap.

(b) Preparation of buffer-substrate pellets.—The following reagent solutions are prepared:

Solution 5: 200 ml. 0.2 molar aqueous sodium-α-keto glutarate. The fresh solution is kept at 0°–4° C. until needed.

Solution 6: 800 ml. of an aqueous solution having the composition of solution 4.

Solution 6 is cooled to 0°–4° C. and then thoroughly mixed with solution 5.

Buffer-substrate pellets of 0.1 ml. of this mixed solution are prepared according to Example 1. They are filled into small polyethylene vials as shown in FIG. 2, each vial containing one pellet. After lyophilization the vials are closed with blue screw caps.

(c) Performance of the kinetic U.V.-assay.—To a vial prepared as described in this example under (a), 0.5 ml. of distilled water and 0.2 ml. of the serum to be assayed are added using Marburg pipettes. After shaking, the resulting solution is brought quantitatively into a 25° C. cuvette of an "Eppendorf" spectrophotometer. Pre-incubation takes place for about 10 minutes. During this time the endogenous substrate in the sample is being converted. Optical density is read until constant. Then a blue-capped vial is opened and 0.1 ml. distilled water is added with a Marburg pipette. The clear solution is then brought quantitatively into the cuvette and thoroughly mixed.

Optical density readings are made then every 30 seconds, and the decrease is noted for at least 2 minutes. The values obtained are averaged, and the S.G.P.T. activity of the sample is calculated using the formula:

$$I.U. = \Delta\ O.D./min. \times 667\ \mu\ mole \times min.^{-1} \times litre^{-1}$$

What is claimed is:

1. A process for forming pellets accurate in unit content from an analytical or immunological test reagent liquid comprising the steps of:
   (a) distributing said test reagent in an aqueous medium in a predetermined concentration;
   (b) forming accurately measured free-falling drops of said reagent containing aqueous medium mixture;
   (c) allowing said drops to fall through a body of liquid being immiscible with water and said test reagent, said liquid having a density less than that of water while maintaining a temperature gradient in said liquid from approximately ambient temperature at the upper surface of said liquid and diminishing to a temperature at the lower portion of said body of liquid above the freezing of said liquid but below the freezing point of said reagent containing aqueous medium, thereby freezing said drops to frozen pellets; and
   (d) collecting the frozen pellets each containing a predetermined quantity of the test reagent, at the bottom of said body of liquid.

2. The process of claim 1 in which said free-falling drop has a volume between about 0.025 and about 0.07 ml.

3. The process of claim 1 in which said water-immiscible liquid is selected from the group consisting of a hydrocarbon, a halogenated hydrocarbon, and mixtures thereof.

4. The process of claim 1 in which the rate of fall of the drop through said water-immiscible liquid is about 1 foot in 2 seconds.

5. The process of claim 1 in which the upper portion of said body of water-immiscible liquid is maintained at a temperature between about 0° C. and ambient.

6. The process of claim 1 in which the frozen pellets are freeze-dried.

7. The process of claim 1 in which said aqueous medium includes an inert bulking agent.

References Cited

UNITED STATES PATENTS

| | | | |
|---|---|---|---|
| 3,138,532 | 6/1964 | Aiello et al. | 264—13 |
| 3,143,475 | 8/1964 | Koff | 264—13 |
| 3,137,630 | 6/1964 | Hecker | 264—14 |

ROBERT F. WHITE, Primary Examiner

J. R. HALL, Assistant Examiner

U.S. Cl. X.R.

264—28